Oct. 1, 1957             J. F. FOSTER             2,807,924

MOUNTING AND ADJUSTING ATTACHMENT STRUCTURE FOR HARVESTERS

Filed March 15, 1954             2 Sheets-Sheet 1

INVENTOR.
J. F. FOSTER
BY
ATTORNEY

Oct. 1, 1957  J. F. FOSTER  2,807,924
MOUNTING AND ADJUSTING ATTACHMENT STRUCTURE FOR HARVESTERS
Filed March 15, 1954  2 Sheets-Sheet 2

INVENTOR.
J. F. FOSTER
BY
ATTORNEY

United States Patent Office 2,807,924
Patented Oct. 1, 1957

2,807,924

MOUNTING AND ADJUSTING ATTACHMENT STRUCTURE FOR HARVESTERS

Jack F. Foster, Moline, Ill., assignor to Deere & Company, Moline, Ill., a corporation of Illinois Application March 15, 1954, Serial No. 416,043

9 Claims. (Cl. 56—11)

This invention relates to a tractor-mounted harvester and more particularly to an attachment structure adapting a harvester for attachment to and detachment from a tractor.

Several of the major manufacturers of farm implements produce tractors as well as a line of implements especially designed for attachment to and detachment from their own tractors. For various reasons not important here, a purchaser may have already acquired a tractor of one manufacturer and will ultimately acquire an implement, such as a harvester, of a different manufacturer. Of course, the two are not especially designed to go together and the problem is then one of developing adequate conversion structure, which is usually the job of the purchaser. Because the manufacturers have recognized the frequency with which their own implements or tractors will be used with implements and tractors of other manufacturers, there has sprung up in the industry the so-called conversion or change-over kit. In most cases, these kits include conversion parts that replace or accommodate themselves to the peculiarities of a particular implement or tractor, for in most cases, although tractors are fundamentally the same, there are certain differences in structure that prevent the attachment thereon of a competitor's implement, or at least render such attachment so difficult and expensive as to deprive the owner of a certain type of tractor of certain advantages and benefits of an implement of a different manufacturer.

According to the present invention, the improved conversion or attachment structure is designed especially to enable the attachment of a harvester on tractors of types for which the harvester was not originally especially designed. In particular, the invention aims at the provision of attachment structure enabling the use of the harvester, originally designed for a tractor having power lift means of a certain type, to attachment on a tractor of a type having power lift means of an entirely different character. For example, the harvester illustrated in the present case is designed especially for attachment to tractors of the type having a power lift characterized by the provision of a rearwardly mounted transverse rockshaft furnishing a source of power for adjusting the harvester. In tractors of other types, the power lift does not have this rockshaft; therefore, the mounting of a harvester of the character referred to on a tractor of the type last mentioned loses some of its advantages because of the heretofore existing difficulty of effecting the proper power connections. According to the present invention, these disadvantages are eliminated by the provision of structure that substantially simulates the transverse rockshaft and lifting connections of the basic tractor. The invention has for further objects the provision of a conversion structure that is relatively inexpensive, one that does not require basic modification in either the original implement or original tractor, one that lends itself readily to mass production and consequently low cost, and one that incorporates various other specific objects and desirable features that will develop as a preferred embodiment of the invention is disclosed in detail in the following specification and accompanying sheets of drawings, the several figures of which will be described immediately below.

Figure 1:
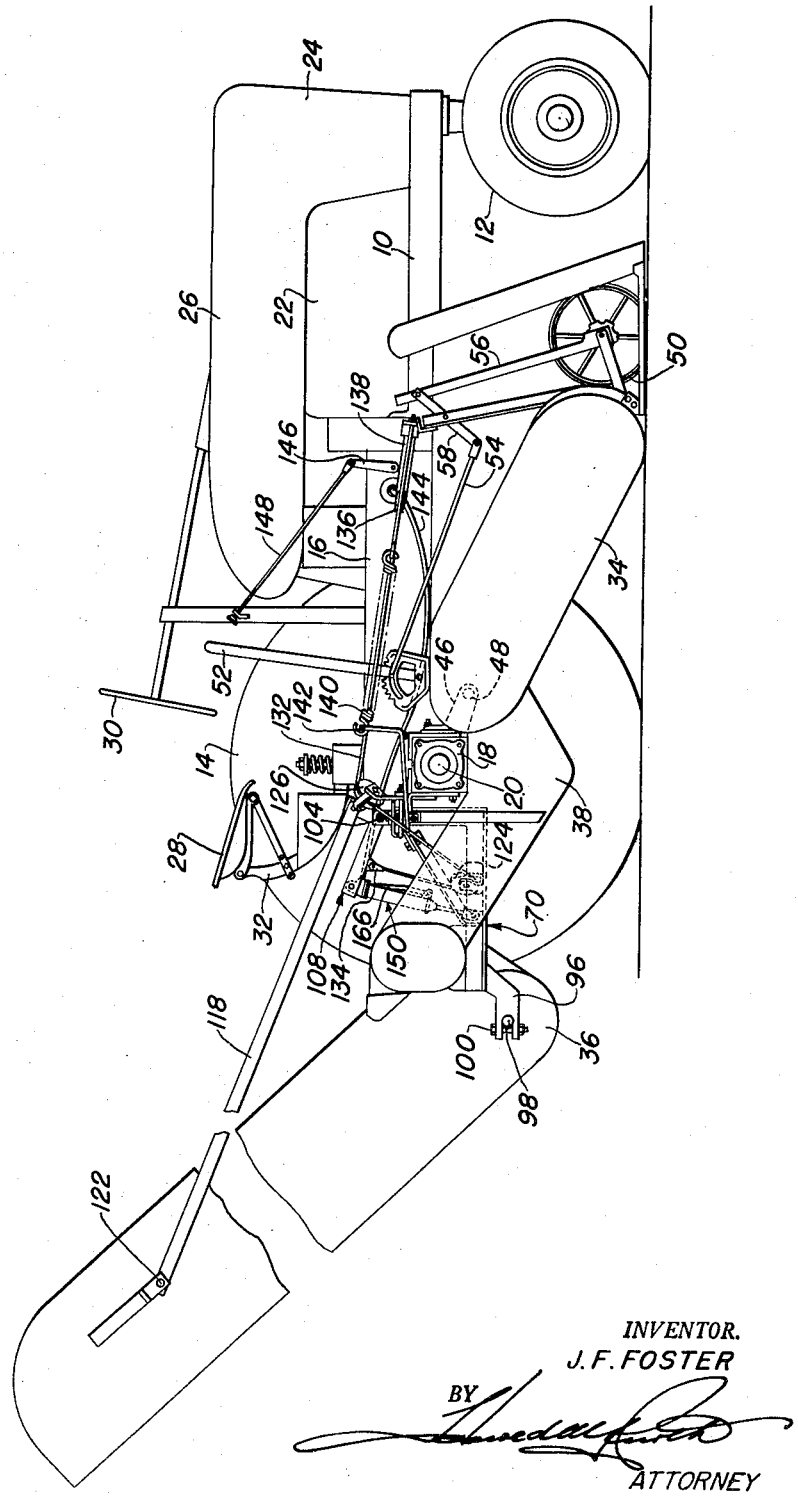
Fig. 1 is a side elevational view of the machine, the near rear wheel having been omitted and the wagon elevator having a portion thereof broken away in the interests of conserving space and of showing clearly structure that would otherwise be obscured by the wheel.

Fig. 1 represents a tractor-mounted harvester that will be recognized by those skilled in the art as embodying a cotton harvester generally of the type shown in the U. S. patent to Roscoe 2,533,510 as mounted on a tractor of the type shown, for example, in the U. S. patent to Mott 2,324,866. The tractor-mounted harvester is by its very nature a self-propelled machine, the tractor itself providing a mobile frame 10 carried on a front rolling truck 12 and a pair of rear relatively widely spaced traction wheels, only one of which appears in the drawings at 14. The intermediate portion of the body, as well as the rear portion thereof, constitutes an elongated transmission and final drive casing 16, from opposite sides of which project casing portions defining a transverse axle 18, the details of which are so well known as to require no further elaboration. The axle carries transverse axle shafts for the traction wheels 14, only one of such shafts being visible and being identified by the numeral 20. The tractor has a conventional power source in the form of an internal combustion engine 22 enclosed at its front by the usual radiator grill structure 24 and at its top by the usual combined hood and fuel tank structure 26. Behind this structure is located an operator's seat 28 and a steering wheel 30 for the steerable front truck 12. For the purpose of orienting Figs. 1 and 2, the seat support is designated by the numeral 32.

The harvester and the various components thereof are shown only rather generally, because the details thereof are not particularly important to the present invention. The harvester comprises essentially a first or front harvester part 34, containing cotton-stripping mechanism (not shown) for stripping cotton from cotton plants planted in rows. The harvester also includes a rear harvester part 36, in the form of a wagon elevator for conveying to a trailing wagon (not shown) cotton gathered by the front harvester part 34 and transferred to the rear harvester part 36 by intermediate conveying structure contained in a fore-and-aft extending housing 38, in this particular case the housing 38 extending beneath the tractor axle 18.

Figure 3:
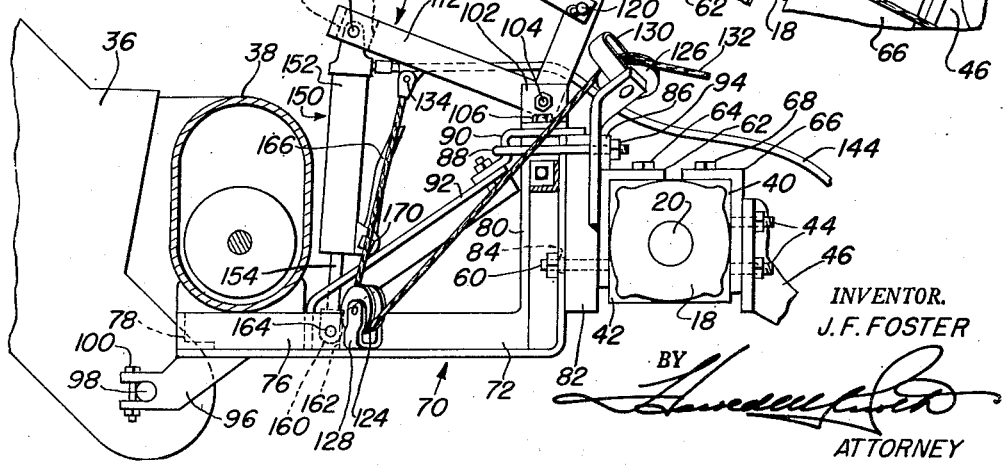
Fig. 3 is a sectional view, on a scale somewhat larger than that of Fig. 1 and somewhat smaller than that of Fig. 2, illustrating the details of the mounting and adjusting structure.

An intermediate portion of the axle 18 has mounting pads thereon, giving this intermediate portion of the axle a substantially square section (Fig. 3). The axle at this portion includes front mounting pads 40 and rear pads 42. The front pad includes a pair of forwardly projecting threaded studs 44 by means of which the axle supports a front bracket 46 providing a pivot 48 on a transverse axis for adjustably mounting the front harvester part 34 for vertical movement. As will hereinafter appear, this vertical movement is separate from that accomplished by vertical adjustment of a gauge wheel 50 through the medium of a hand lever 52—located adjacent to the operator's seat 28—and suitable links 54 and 56 and an intermediate lever 58. Adjustment of the gauge wheel 50 by means of the hand lever 52 regulates the height of the harvester part 34 relative to the ground while the machine is operating. The additional adjustment or movement of the part 34 about the pivot 48 clears the part 34 as well as the gauge wheel 50 from the ground for transport purposes. These details will be outlined below.

The rear mounting pad 42 includes a plurality of rearwardly extending threaded studs, only one of which is shown at 60, but the presence of others will be readily inferred. The stud 60 projects through or in some cases may be directly carried by a transverse angle section 62 having its top flange secured to the upper surface of the axle 18 as by means of a plurality of cap screws 64. A similar angle section 66 may be utilized as part of the mounting for the bracket 46, this section being secured to the axle by a plurality of cap screws 68.

Figure 2:
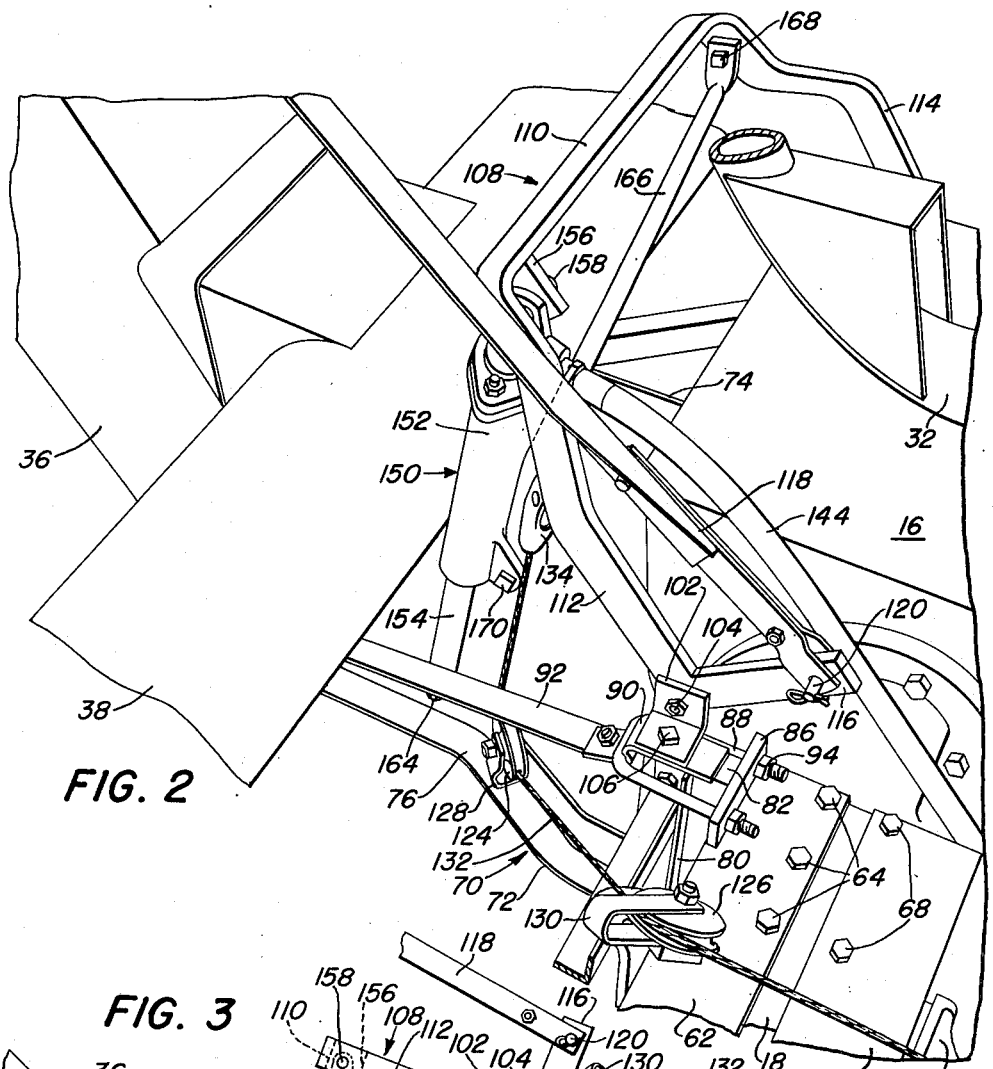
Fig. 2 is an enlarged fragmentary perspective view of a rear portion of the machine.

A basic part of the invention resides in the provision of a mounting frame or support, designated in its entirety by the numeral 70, and including right- and left-hand L-shaped members 72 and 74, the latter being only partly visible in Fig. 2. Since these are symmetrical, only one need be described as to details, it being readily apparent that what is true of one will be true of the other. The L-shaped member 72 has a rearwardly extending and rigid bracket means on a supporting element 76 constituting one leg of the L. The leg of the opposite member 74 is cross-connected to the element 76 as by means of a transverse angle bar 78. The other leg of the L 72 constitutes an upright portion 80 having axle-receiving parts here comprising the rear angle section 62, mounting stud 60 and other components to be presently described; although, some of these may be omitted, depending upon the nature of the axle to which the support or mounting frame 70 is being attached.

An upright member 82 is interposed between the depending rear flange of the rear angle section 62 and the forward face of the upright part 80 of the support 70. This member is rigidly secured to the angle section 72 by the stud 60, which stud passes also through an appropriate aperture, as at 84, in the leg or upright part 80. An upstanding apertured ear 86 on the rear angle section 62 receives the threaded legs of a U-bolt 88, the bight of which embraces a strap 90 rigidly secured to a rearwardly and downwardly extending brace 92 that extends between an upper portion of the upright leg 80 and a rear portion of the horizontal leg 76 of the support or frame 70. Nuts 94 tightened on the legs of the U-bolt 88 adequately secure the upper portion of the frame 70 to the axle 18. Since the other side of the frame is duplicated, and since the two sides of the frame are cross-connected by at least the member 78, the entire structure 70 is of considerable strength and serves other purposes, to be described below, as well as the purpose of supporting the rear harvester part or wagon elevator 36, which result is accomplished by the provision of a pair of rearwardly extending bifurcated brackets 96 serving to receive a transverse shaft 98 at the lower end of the elevator 36. The shaft is retained in place by removable means in the form of bolts 100 and establishes a pivot on a transverse axis about which the wagon elevator may be moved in an upright fore-and-aft plane.

The mounting frame 70 has its rearwardly projecting support element established by the legs 76. Considering, as outlined above, that both sides 72 and 74 of the mounting frame 70 are symmetrical, it will be seen from the description thus far that the legs 76 constitute rearwardly projecting support elements at a level below that of the axle. The upright element 80 lies adjacent to the axle and in addition to the detachable axle-engaging parts heretofore described has rigidly mounted thereon a member 102 which provides a pivot at 104 on a transverse axis. The member 102 is here shown as a short angle member constituting in effect a bearing, the horizontal flange thereof being secured as by a bolt 106 to the strap 90 and the upright flange establishing the bearing or pivot 104. It will be realized, of course, that the leg at the other side (not visible) has a similar pivot or bearing and that these pivots or bearings are coaxial on a common transverse axis. This axis is above the level of the axle 18. As previously described, the structure 98—96 constitutes means on the mounting frame for sustaining the rear harvester part 36 for adjustment in a fore-and-aft upright plane.

The mounting frame carries thereon a U-shaped lift member, designated in its entirely by the numeral 108, which member has a transverse bight 110 and a pair of fore-and-aft legs 112 and 114. The free or forward ends of the legs are pivotally mounted on the bearings or pivots at 104, these legs projecting rearwardly from the pivot axis at 104 above the support element 76 to dispose the bight 110 to the rear of the axle and spaced above the element 76, occupying normally the position shown in the drawings.

The right-hand leg 112 of the lift member 108 has projecting upwardly therefrom at its forward end a rigid arm 116, this arm constituting a lever having the pivot 104 as its fulcrum. Stated otherwise, the lift member as viewed in elevation is in the form of a bell crank, one arm being the arm 116 and the other being the leg 112. The lift member is, of course, rockable about the pivot axis at 104 and the two arms 112 and 116 of the bell crank are utilized to establish force-transmitting connections to the harvester parts 36 and 34, capable of adjusting these parts about their axes at 98 and 48, in a manner to be presently described.

The connection between the arm 116 and the harvester part or wagon elevator 36 is effected by means of an elongated link 118, the forward end of the link being pivotally connected at 120 to the arm and the rear end of the link being pivotally connected at 122 to an upper portion of the elevator 36. Consequently, when the lift member 108 is rocked about its fulcrum or axis 104, the wagon elevator 36 will be pivoted about its cross shaft 98.

The force-transmitting connection between the lift member 108 and the front harvester part 34 comprises first and second sheaves 124 and 126. The sheave 124 is mounted in an appropriate bracket 128 secured to a portion of the support element 76 intermediate the front and rear ends thereof and at a level, of course, below that of the axle 18. The sheave 126 is adequately mounted in a bracket or support 130 mounted on the frame 70 as clearly shown in Fig. 3, being thus disposed at a level above that of the axle 18. The force-transmitting means further includes a cable 132 dead-ended or anchored at 134 to a rearward portion of the leg 112 of the lift member 108. The cable extends thence downwardly and is trained under and about the lower sheave 124, extending thence upwardly to be trained over the upper or second sheave 126. The cable extends thence forwardly and has its opposite end dead-ended or anchored at 136 to a link 138 attached to a forward upper portion of the front harvester part 36. A counterbalance or assist spring 140 is connected between the link 138 and a suitable bracket 142 mounted on the rear axle 18. Thus, rocking of the lift member 108 in a clockwise direction tightens the cable 132 and raises the front harvester part 34 about its pivot axis at 48, simultaneously, because of the lift arm 116, raising the rear end of the wagon elevator 36 about its pivot established by the cross shaft 98. The purpose of the conjoint raising of the harvester parts 34 and 36 is to elevate the gathering part 34 clear of the ground on turns and for transport purposes, simultaneous raising of the wagon elevator 36 being necessary to clear the elevator from possible contact with the trailing wagon (not shown here), an arrangement in general that is not novel.

As previously described, the tractor on which the harvester is mounted, as illustrated here, is of the type shown in the above-mentioned patent to Mott 2,324,866. One characteristic of this tractor is that the power lift means therein is embodied in a forward part of the body casing 16, there being visible in Fig. 1 a fluid conduit 144 serving to transmit fluid to and from a fluid power source (not shown) contained within the body as just stated. A rockable arm 146 under control of a link 148 that extends into proximity to the operator's seat 28 controls the fluid source. In harvesters and other implements designed especially for a tractor of the type disclosed, adequate utilization is made of the fluid power means, but the advantages of that particular means disappear to some extent when this tractor is used with implements manufactured by another. This is particularly true in the case of a harvester designed especially for a tractor of the type having a fluid power system including a transverse rockshaft, such as that illustrated in the U. S. patent to Jirsa et al. 2,532,552. In such tractor, the location of the rockshaft would be approximately coincident with the pivot axis 104. According to the present invention, a harvester designed especially for a tractor of the type shown in the Jirsa patent is adapted to a tractor of the type shown here by compensating for the lack of a rockshaft by utilizing the lift member 108, having its fulcrum at 104 which, as just stated, approximates the axis of a tractor-mounted rockshaft. Consequently, the basic machine may be equipped with the mounting frame 70 and other parts, including the wagon elevator lift link 118 and the cable and sheave arrangement 124—126—132, including also the connection at 134. In a tractor having the Jirsa system, the connection at 134 would be made to an arm on the rockshaft and the connection at 120 would be effected at another arm on such rockshaft. Since that rockshaft is not present in a tractor of the type disclosed, the basic harvester unit, in the absence of the present invention, would require considerable conversion structure, particularly if it is desired to utilize the fluid power source of such tractor. The conversion structure therefore incorporates the lift member 108, mounted as aforesaid and having provision thereon for the connections at 120 and 134, these parts being so designed as to simulate the arms on a rockshaft of a tractor having the Jirsa et al. system. Consequently, the basic harvester may be readily used with the tractor shown, requiring only the change just noted, plus the utilization of the tractor fluid power source, which last feature is accomplished in a manner to be set forth below.

In addition to the provision for dead-ending the cable at 134, the lift member 108 has means thereon for mounting the upper end of a force-exerting device, such device being shown here in the form of a fluid motor or cylinder and piston assembly designated in its entirety by the numeral 150 and having a first or cylinder member 152 and a piston (not shown) including a second member or piston rod 154. The means on the lift member 108 for receiving the upper end of the cylinder 154 comprises an apertured ear 156 alined with an apertured portion of the rear end of the right-hand leg 112, these portions receiving a transverse pin or bolt 158 for establishing a releasable connection. The support element 76 likewise has means thereon for receiving the clevised end 160 of the piston rod 154. This means comprises a suitable apertured ear 162 alined with an apertured portion of the leg 76 to receive a releasable connecting pin 164. The upper end of the motor 150 is connected to the fluid line or hose 144, previously described. The motor 150 is normally furnished as standard or special equipment with tractors of the type disclosed and is commonly known as a remote cylinder. The provision of the mounting frame 70 in connection with the lift arm 108 enables the use of that or an equivalent cylinder in the location just described. The removable connecting pins 158 and 164 enable rapid and easy connection and disconnection. If the mounting frame 70 is furnished as part of a harvester designed especially for a tractor utilizing the Jirsa system, the lift member 108 need not be utilized, but its omission will not affect the basic organization of the structure and the appropriate connections can be made at 120 and 134 to rockshaft arms (not shown here, of course) as previously described.

Since the force exerted by the force-exerting device or motor 150 would normally be confined to the right-hand side of the lift member 108 and would therefore impose twisting forces on the entire member 108, a diagonal brace member 166 is connected between a point 168 at the rear end of the left-hand leg 114 of the member 108 and a lower part of the cylinder 152 as designated by the numeral 170. The connections at 168 and 170 are pivotal and therefore do not interfere with proper operation of the lift member 108.

The general features and characteristics of the preferred embodiment of the invention have been covered above. Specific objects and features not categorically enumerated will undoubtedly occur to those versed in the art, as will numerous modifications and alterations in the instant disclosure, all of which may be achieved without departing from the spirit and scope of the invention.

What is claimed is:

1. Mounting and power adjusting attachment structure for a tractor-mounted harvester in which the tractor has a transverse rear axle and a fluid power source ahead of the axle and the harvester has front and rear adjustably carried harvester parts located respectively ahead and to the rear of the axle, said structure comprising: a mounting frame positioned behind the rear axle and including a rigid, rearwardly projecting support element at a level below that of the axle and an upright element adjacent to the axle and having detachable axle-engaging parts thereon rigidly mounting said frame on the axle, said upright element including transverse pivot means, and said support element having means thereon pivotally sustaining the rear harvester part for adjustment in a fore-and-aft upright plane; a U-shaped lift member having a transverse bight and a pair of fore-and-aft legs, said legs having free end portions respectively pivotally mounted on the aforesaid transverse pivot means and projecting rearwardly therefrom above the support element to dispose said bight to the rear of the axle and spaced above said support element; an arm rigid on the lift member and forming a lever having the aforesaid transverse axis as its fulcrum and connected to the rear harvester part; an expansible and contractible fluid-pressure device connected between the support element and the lift member and having a fluid connection to the tractor fluid source for rocking said lift member; and force-transmitting means connected to the lift member and to the front harvester part for adjusting the latter as said member is rocked.

2. The invention defined in claim 1 in which: the expansible and contractible device comprises a fluid motor having first and second relatively movable motor members connected respectively to the support element and to one leg of the lift member, and a rigid brace member connected to the second motor member and to the other leg of said lift member.

3. The invention defined in claim 1, in which: the force-transmitting means comprises a first sheave mounted on the support element, a second sheave carried by the mounting frame above the tractor axle, and a cable anchored at one end to the lift member, trained under the first sheave and over the second sheave and extending forwardly over the axle to have its other end anchored to the front harvester part.

4. Mounting and power adjusting attachment structure for a tractor-mounted harvester in which the tractor has a transverse rear axle and a fluid power source ahead of the axle and the harvester has an adjustably carried harvester part located in fore-and-aft spaced relation to and in front of the axle, said structure comprising: a mounting frame positioned behind the rear axle and including a rigid, rearwardly projecting support element at a level below that of the axle and an upright element adjacent to the axle and having detachable axle-engaging parts thereon rigidly mounting said frame on the axle, said upright element including transversely spaced apart members providing coaxial pivots on a transverse axis; a U-shaped lift member having a transverse bight and a pair of fore-and-aft legs, said legs having free end portions respectively pivotally mounted on the aforesaid members and projecting rearwardly therefrom above said support element; an extensible and contractible fluid-pressure device connected between the support element and the lift member and having a fluid connection to the tractor fluid source for rocking said lift member; and force-transmitting means connected to the lift member and to the front harvester part for adjusting the latter as said member is rocked.

5. The invention defined in claim 4, in which: the expansible and contractible device comprises a fluid motor having first and second relatively movable motor members connected respectively to the support element and to one leg of the lift member, and a rigid brace member connected to the second motor member and to the other leg of said lift member.

6. The invention defined in claim 4, in which: the force-transmitting means comprises a first sheave mounted on the support element, a second sheave carried by the mounting frame above the tractor axle, and a cable anchored at one end to the lift member, trained under the first sheave and over the second sheave and extending forwardly over the axle to have its other end anchored to the front harvester part.

7. Mounting and power adjusting attachment structure for a tractor-mounted harvester in which the tractor has a transverse rear axle and the harvester is positioned ahead of the axle, said structure comprising: a detachable mounting frame behind the tractor axle and having detachable axle-engaging parts mounting said frame rigidly on the axle, said frame having an upper portion providing a transverse pivot; a lift member having front and rear ends and mounted at its front end on said pivot and extending rearwardly at about the level of said pivot; a rigid bracket means at a lower portion of the mounting frame in spaced relation below the rear end of the lift member and having means thereon for receiving one end of a force-exerting device; means on the lift arm for receiving the other end of said force-exerting device; and force-transmitting means connected to the lift arm and extending forwardly past the tractor axle and connected to the harvester.

8. The invention defined in claim 7, in which: the force-transmitting means comprises a first sheave on the mounting frame adjacent to the means on said frame that receives the force-exerting device, a second sheave on the mounting frame above the level of the tractor axle, and a cable dead-ended on the lift member adjacent the rear end thereof, extending downwardly and trained under the first sheave, extending upwardly and trained over the second sheave and extending thence ahead of the axle to a connection with the harvester.

9. Mounting and power adjusting attachment structure for a tractor-mounted harvester of the type in which the tractor has a transverse rear axle and a forwardly located power source and the harvester has a front harvester part ahead of the axle and a rear harvester part behind the axle, said structure comprising: a detachable support having axle-engaging parts mounting said frame rigidly on and behind the tractor axle, said support having upper and lower portions respectively above and below the axle; a bell crank pivoted on the upper portion on a transverse axis and having first and second arms; means connecting the first arm to the front harvester part; means connecting the second arm to the rear harvester part; and tractor-powered force-exerting means connected between one arm of the bell crank and the lower portion of the support and operative to rock the bell crank about the aforesaid pivot; and means connecting said device to the tractor power source.

References Cited in the file of this patent
UNITED STATES PATENTS

| Re. 22,279 | Hyman et al. | Mar. 2, 1943 |
| 2,324,866 | Mott | July 20, 1943 |
| 2,375,970 | Williams | May 15, 1945 |
| 2,532,552 | Jirsa et al. | Dec. 5, 1950 |
| 2,533,510 | Roscoe | Dec. 12, 1950 |
| 2,656,776 | Cox et al. | Oct. 27, 1953 |
| 2,677,226 | Hyman | May 4, 1954 |